United States Patent [19]

Grubbs

[11] Patent Number: 4,477,748
[45] Date of Patent: Oct. 16, 1984

[54] SOLID STATE BALLAST

[75] Inventor: Calvin E. Grubbs, Garland, Tex.

[73] Assignee: Thomas Industries, Inc., Louisville, Ky.

[21] Appl. No.: 194,783

[22] Filed: Oct. 7, 1980

[51] Int. Cl.³ .................. G05F 1/00; H05B 37/00; H05B 39/00; H05B 41/14

[52] U.S. Cl. ................ 315/306; 315/DIG. 2; 315/DIG. 7; 315/307; 315/308; 315/194; 307/252 P; 307/252 M

[58] Field of Search ............... 315/247, 306, 307, 308, 315/310, 311, 291, 194, DIG. 5, DIG. 2, DIG. 7; 307/252 T, 252 M, 252 UA, 252 P

[56] References Cited

U.S. PATENT DOCUMENTS

| | | | |
|---|---|---|---|
| 3,541,421 | 11/1970 | Buchman | 315/247 |
| 3,648,106 | 3/1972 | Engel et al. | 315/291 |
| 3,879,652 | 4/1975 | Billings | 307/252 UA |
| 3,904,922 | 9/1975 | Webb et al. | 307/252 P |
| 3,936,726 | 2/1976 | Kelley, Jr. | 307/252 UA |
| 3,969,652 | 7/1976 | Herzog | 315/DIG. 5 |
| 3,999,100 | 12/1976 | Dendy et al. | 315/DIG. 5 |
| 4,004,188 | 1/1977 | Cooper | 315/DIG. 7 |
| 4,210,846 | 7/1980 | Capewell et al. | 315/DIG. 5 |
| 4,220,896 | 9/1980 | Paice | 315/307 |
| 4,240,009 | 12/1980 | Paul | 315/DIG. 5 |
| 4,277,728 | 7/1981 | Stevens | 315/307 |
| 4,329,627 | 5/1982 | Holmes | 315/DIG. 5 |
| 4,334,183 | 6/1982 | Hauenstein | 307/252 UA |
| 4,414,493 | 11/1983 | Henrich | 315/308 |

Primary Examiner—Saxfield Chatmon
Attorney, Agent, or Firm—Emrich & Dithmar

[57] ABSTRACT

A thyristor/capacitor inverter bridge energizes the lamp circuit with a high frequency oscillating voltage derived from full-wave rectified line voltage. Lamp current is regulated by a commutation circuit which is synchronized with zero crossings of the thyristor current. When power is first applied, an initialization circuit initiates a time delay to permit lamp warm up and then enables the high frequency inverter to begin energizing the lamp load. A re-strike circuit generates pulses coupled to the commutation circuit to re-start it when the rectified line voltage falls below that which is necessary to sustain oscillation of the inverter. Fault detection circuits are included for detecting faults such as loss of primary power, thyristor over-voltage, and thyristor over-current for taking corrective action, such as inhibiting the inverter and commencing a new initialization sequence. In addition, in the case of thyristor over-current, which may indicate that both power thyristors are conducting at the same time, the power thyristors are commutated. A fault count circuit determines whether a predetermined number of such faults occurs within a preset time, and if so, the system is shut down and manual reset may be required.

26 Claims, 6 Drawing Figures

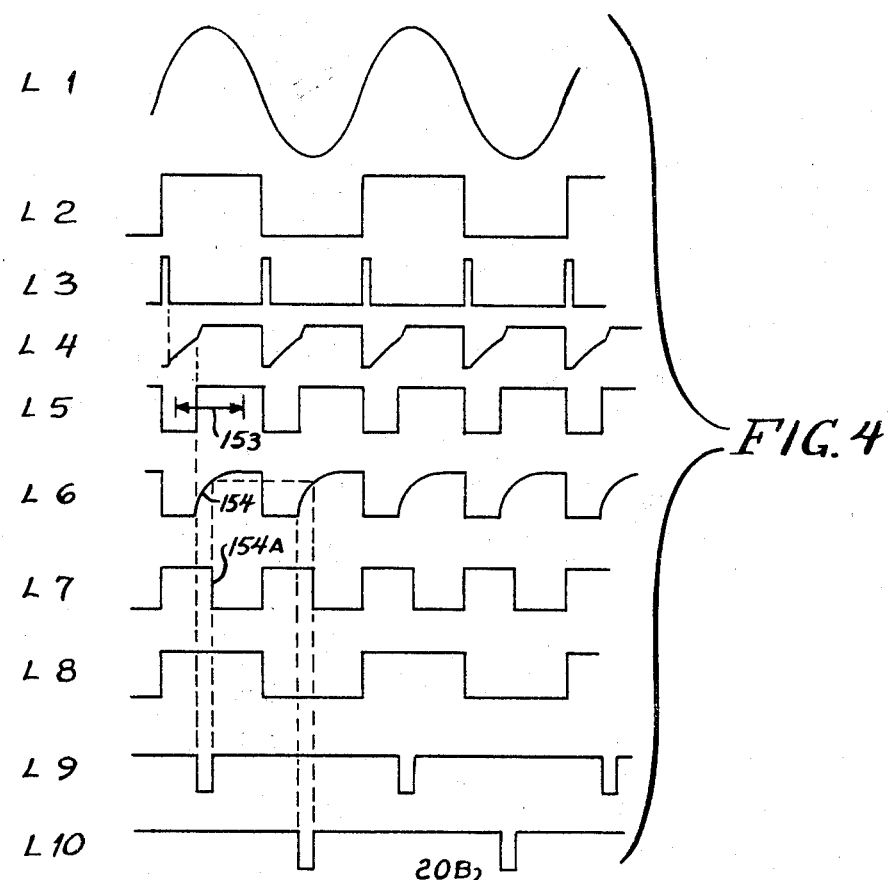
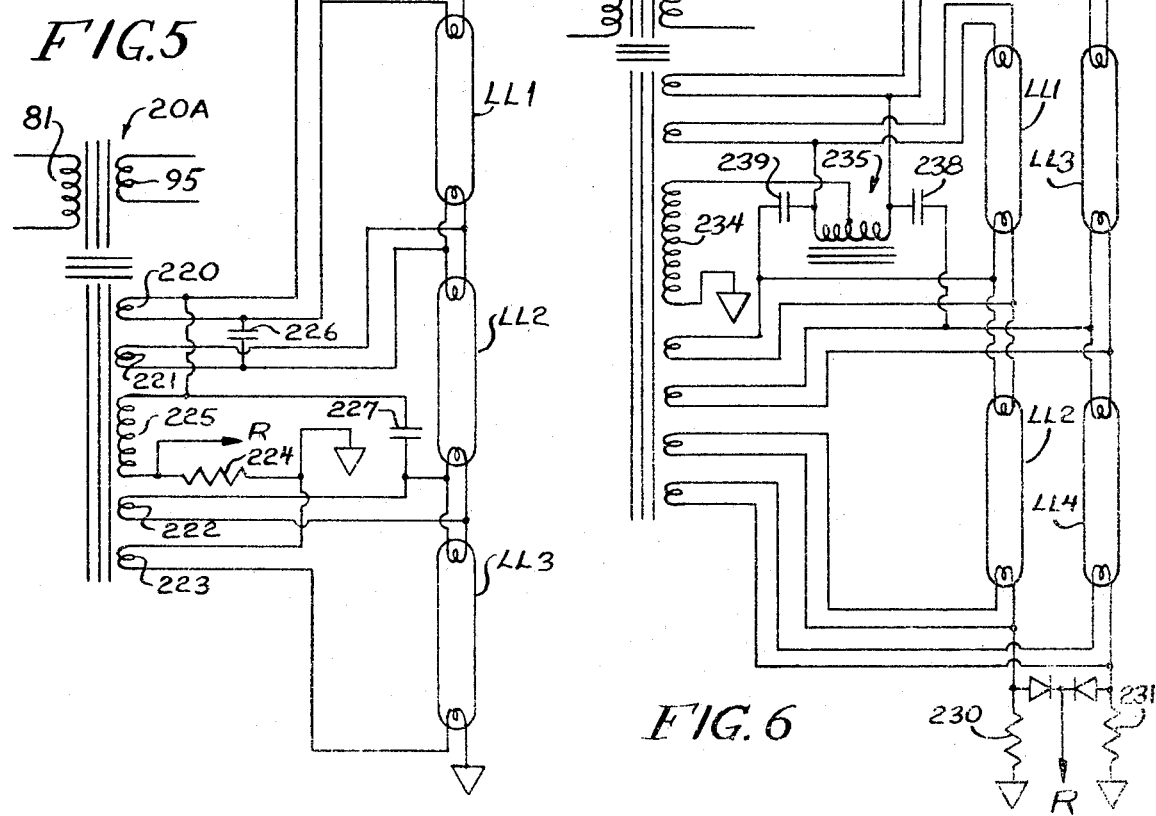

SOLID STATE BALLAST

BACKGROUND AND SUMMARY

The present invention relates to a ballast circuit for gaseous discharge lamps; and more particularly to a high frequency ballast, operating on conventional 60 hertz power and energizing the lamps at a higher frequency in the neighborhood of 20–25 KHz.

It is known and recognized that gaseous discharge lamps, such as fluorescent lamps and high-intensity discharge (HID) lamps convert electrical energy to light more efficiently at the higher frequency than at 60 or 120 Hz, such as 15–20 KHz.

Despite the economic incentive to energize gas discharge lamps with a higher frequency, and even though many solid state ballast circuits have been proposed in the literature and are otherwise known, there has been no solid state ballast circuit which has gained widespread commercial acceptance. There are perhaps many factors which have contributed to the lack of a commercial solid state, high-frequency ballast or inverter for gaseous discharge lamps, among which are the low initial cost of conventional ballasts due to the large volume and efficient production techniques which are employed, thereby at least partially offsetting any reduction in operating costs by reducing the initial outlay. Further, from a technical standpoint, when solid state ballasts were first developed, the power switches that were available for operating at the frequency and current levels required, were either too expensive or not reliable enough. Many of these problems have now been overcome due to advances in technology, and further, the increased cost of energy has emphasized the need for reducing operating costs over the long term.

Manufactures are, however, still faced with probleas. Among such problems is the need to provide protection for the various faults which may occur in a solid state ballast, such as excessive current or voltage in the thyristor power circuit, lamp over-voltage, loss of primary power, lamp failure, and so on.

Considering the various applications, such as fluorescent lamps, low and high pressure sodium, and metal halides, if a separate solid state ballast is required for each such application, and each ballast must include not only the numerous fault protection mechanisms, but also regulate lamp current during normal operation, provide for start up and re-strike during the period between cusps of primary power when oscillation may be extinguished, it can be seen that development costs would quickly get out of hand, and a manufacturer would not be able to employ the tested techniques of one system to the other, as is normally done during the course of development to enhance reliability of the commercial system.

Briefly, then, the present invention is directed to a solid state ballast circuit in which the primary logic control techniques for lamp current regulation and fault protection may be used in a wide range of applications including fluorescent lamps (two-, three- and four-lamp loads), low pressure sodium, high pressure sodium, metal halide, and mercury lamps. Further, the circuitry is readily adaptable to all commercially available voltages and frequencies. This is not to say that all such ballasts are interchangeable, but rather, only relatively minor changes are required for each application from a manufacturing standpoint, and the basic logic and fault detection techniques are common to all applications.

The present invention employs a thyristor/capacitor inverter bridge which energizes the lamp circuit with a high frequency oscillating voltage derived from full-wave rectified line voltage. The lamp circuit, in the case of a fluorescent ballast, may include two, three or four lamps.

Lamp current is regulated by a commutation timing and pulse shaping circuit which derives its timing from, and is synchronized with, zero crossings of the thyristor current. As used herein, "commutation" refers to the firing or conduction of the power thyristors in relation to the phase of the inverter (thyristor) current. The commutation timing and pulse shaping circuit has an inherent minimum delay from each zero crossing of the thyristor current to permit the thyristors to commutate during each cycle of high frequency oscillation. An output signal of a lamp current sensing amplifier delays firing or commutation of the thyristors beyond the previous zero crossing as a function of increasing lamp current. In other words, when lamp current is at a relatively low value, the current sensing amplifier will advance the commutation time of the power thyristor that is to be turned on to thereby add energy to the oscillating circuit feeding current to the lamps; and as lamp current builds up, the commutation timer increases the delay between a zero crossing and the commutation time, thereby regulating the current (and energy) coupled to the lamp power circuit. A binary circuit is clocked by the output of the commutation timing and pulse shaping circuit to steer the output pulse alternately to one of the power thyristors, thereby generating the oscillating mode of the high frequency inverter. The frequency of oscillation is determined primarily by the resonance of the power bridge capacitors and the inductance in the transformer delivering current to the lamp load.

When power is first turned on, an initialization circuit initiates a time delay to permit circuit stabilization, and then enables the high frequency inverter to begin energizing the lamp load with a gradual build-up of power. This initialization circuit is also used to re-commence operation after certain faults are detected, as explained further below.

A re-strike circuit generates pulses coupled to the commutation timer and pulse shaping circuit to re-start operation when the rectified line voltage falls below that which is necessary to sustain oscillation of the inverter circuit.

Fault detection circuits are included for detecting: (a) loss of primary power (one or more half cycles), (b) lamp over-voltage for a predetermined time, and (c) thyristor over-current. If lamp current or lamp voltage become excessive, the commutation timer is responsive to such condition for extending the commutation time of the power thyristors, thereby reducing energy coupled to the lamp load.

If one of the fault detection circuits detects a loss of primary power, excessive lamp voltage for a predetermined time or excessive thyristor current, the initialization circuit, mentioned above, is reset to inhibit inverter oscillation for the initial start up period, which should enable the fault condition to subside, and to then re-commence an initialization cycle. In addition, if the detected fault is excessive thyristor current, it may be indicative of "punch through", that is, a condition in which both thyristors are conducting at the same time.

In this event, the power thyristors are commutated to the off state during the period of delay mentioned.

A fault count circuit determines whether a predetermined number of faults occurs successively within a preset time; and if so, the inverter is shut down and must be reset manually, as by turning off the main power and turning it back on.

The present invention thus includes logic and control circuitry as well as power circuitry which may be adapted, with only minor variation to the various applications which a commercial solid state ballast must accommodate. Further, as will be more fully explained below, the logic and control section, although employing some analog circuits, uses primarily digital circuit techniques with their enhanced reliability and accuracy. All of the circuits used in the logic and control portion of the system are amenable to commercialization using modern integrated circuit techniques so that they can be incorporated on a single "chip". By using the chip in many hours of testing and actual commercial applications, the experience gained can be used to enhance reliability and efficiency for not only fluorescent lamp applications but for HID applications as well.

Additional advantages, some of which are inherent at least to some extent in earlier suggested solid state ballasts include: the ability to dim the lamp with simple circuit modification, either manually or automatically in response to ambient conditions to reduce energy consumption; cooler operation and reduced power loss due to more efficient conversion of electric power to light, resulting in reduced load on air conditioning systems; reduced size and weight of the ballasts resulting in lower shipping and installation costs; and more quiet operation.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 4 is a voltage timing diagram illustrating various voltage waveforms in the circuit of FIGS. 2 and 3;

FIG. 5 is a circuit schematic diagram illustrating a lamp load circuit for three fluorescent lamps; and FIG. 6 is a circuit schematic diagram illustrating a lamp load circuit for four fluorescent lamps.

DETAILED DESCRIPTION

I. Description of Functional Block Diagram

Figure 1:
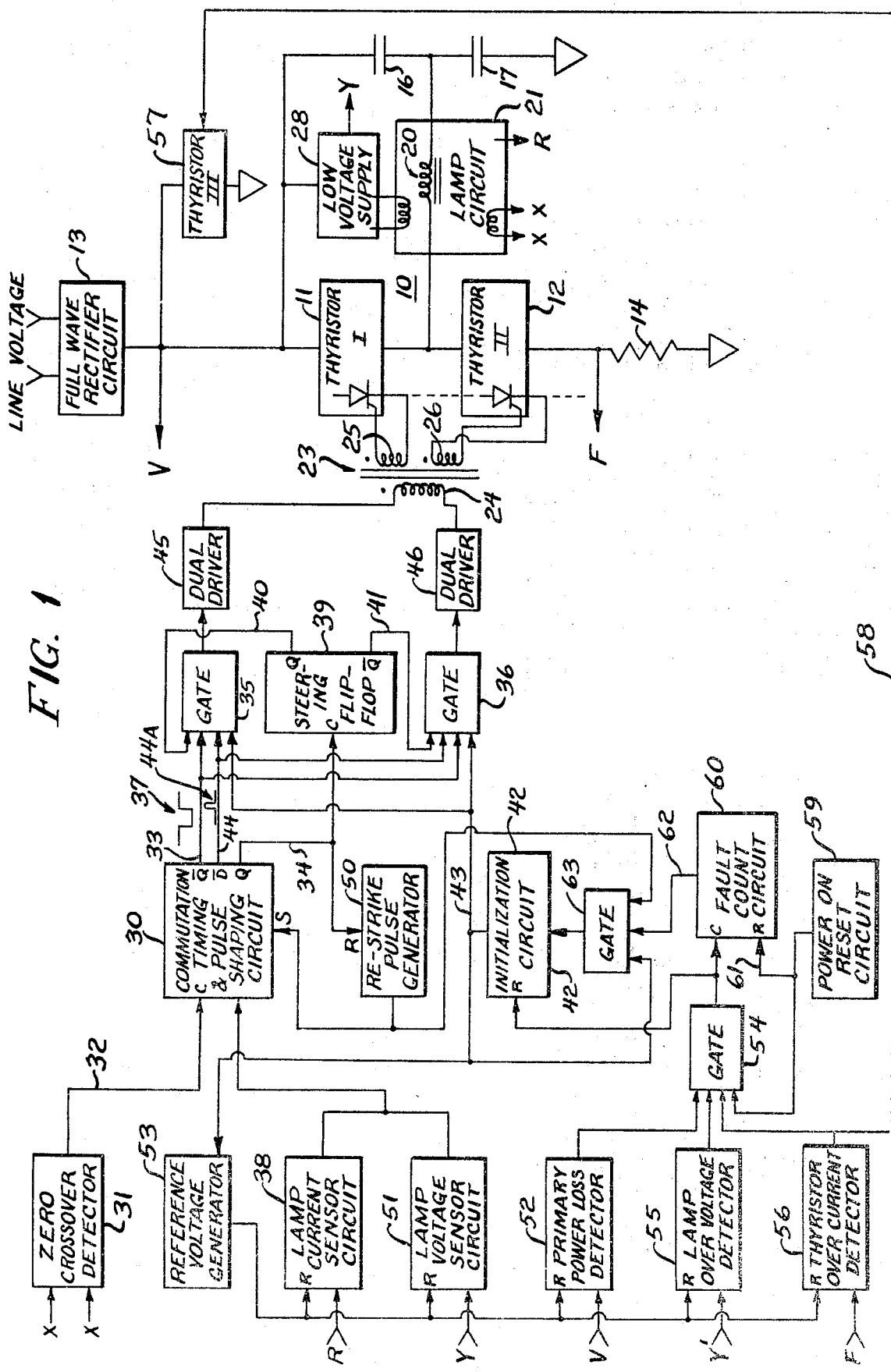
FIG. 1 is a functional block diagram of a system incorporated within the present invention.

Referring first to FIG. 1, reference numeral 10 generally designates a thyristor/capacitor bridge circuit including first and second thyristors (silicon control rectifiers) 11, 12 connected in series with a full-wave rectifier circuit 13 and a current-sensing resistor 14. The full-wave rectifier 13 receives standard line power (60 Hz., for example) and converts it to a full-wave rectified output signal.

The bridge circuit 16 also includes first and second balanced capacitors 16, 17, connected in series across the thyristors 11, 12. The diagonal branch of the bridge 10 includes a power transformer generally designated 20 (only the primary winding of which is diagrammatically illustrated in FIG. 1) and a current transformer (see 92 in FIG. 3). The output of transformer 20 is coupled to a lamp load comprising gaseous discharge lamps, represented by the block 21.

The thyristors 11, 12 are gated by a signal coupled through a pulse transformer generally designated 23. The transformer 23 includes a primary winding 24 driven by the logic and control circuitry of the system, and first and second secondary windings 25, 26 which are connected in circuit respectively with the gate leads of the thyristors 11, 12 in such a manner that current flowing through primary winding 24 in one polarity will cause thyristor 11 to conduct, and current flowing through the primary 24 in the opposite polarity will cause thyristor 12 to conduct.

A low voltage supply circuit 28 draws power from the output of the rectifier 13 for energizing the logic and control circuitry to be described presently. An energy-conservation feature of the low voltage supply circuit 28, particularly useful in conserving energy when the line voltage is 220 volts or higher, will be described in connection with the detailed description of the circuit schematic for the low voltage supply circuit.

There are various signals which are generated in the power stage (FIG. 3) of the system including the following:

1. A signal denoted R is derived in the lamp load circuit 21 which is representative of the high frequency lamp current.

2. A signal derived on leads X—X represents the timing or phasing of thyristor current in the primary winding of power transformer 20.

3. A signal denoted Y is generated in the low voltage supply circuit 28; and it is representative of the voltage in the thyristor circuit.

4. A signal denoted V is generated at the output of the full wave rectifier bridge 13 and is used to indicate the presence or absence of primary power.

5. A signal denoted F is the voltage across resistor 14, and it is representative of the instantaneous value of the high frequency inverter current passing through the thyristor (and through both thyristors in the event of a short-circuit fault).

Turning now to the logic and control portion of the circuitry, a commutation timing and pulse shaping circuit shown within block 30 receives timing information on a clock input C from a zero crossover detection circuit 31, the input signal to which is a signal designated X—X, described above, and representing the phasing of the inverter current. At each zero crossover of thyristor current (whether the current is crossing over from a positive to a negative polarity or from a negative to a positive polarity), the zero crossover detection circuit 31 clocks the commutation timing and pulse shaping circuit 30 over a line designated 32 in FIG. 1.

The output signal of the commutation timing and pulse shaping circuit is a binary signal having complementary polarities respectively on output lines 33 and 34 which are Q̄ and Q outputs of the commutation timing and pulse shaping circuit.

The signal on line 33 is a pulse signal as indicated at 37, which is coupled to the inputs of two gate circuits 35, 36. The signal 37 is forced to a logic "0" at the beginning of each half cycle of the inverter frequency (i.e. at the time of a zero current crossing as determined by the zero crossover detector 31). When the signal 37 is a "0" it inhibits gates 35, 36; and when it is a "1", it enables them. The duration or "width" of the pulse 37 is determined, under normal operating conditions, by the magnitude of the current flowing in the lamp load circuit, as defined by the signal R. The signal R which is generated in the lamp load circuit 21 is coupled to a lamp current sensor circuit 38, the output of which is coupled as an input signal to the commutation timing and pulse shaping circuit and, as will be explained more fully below, acts to lengthen the width of the pulse 37 as current values increase, and to shorten the width of that pulse as sensed current decreases. By increasing the width of pulse 37 the succeeding commutation time is delayed, and energy coupled to the power stage is reduced; and by decreasing its width, output power is increased. In this manner, the lamp current is regulated.

The gate circuits 35, 36 are enabled in alternate half cycles of inverter frequency by the complementary outputs of a steering flip flop 39 via lines 40, 41 respectively. The gates 35, 36 are also enabled by the output of an initialization circuit 42 received along a line 43. The signal input to the gates 35, 36 is a pulse 44A derived by the commutation timing and pulse shaping circuit 30 from the signal 37; and it is coupled to these gates via line 44.

The outputs of the gates 35, 36 are coupled respectively to the terminals of the primary 24 of the pulse transformer 23 by means of dual driver circuits 45, 46. If the gate 36 is enabled by the steering flip flop 39, the output pulse 44A of the commutation timing and pulse shaping circuit 30 will be coupled to the transformer 23 to generate a signal to cause thyristor 12 to conduct. Conversely, if the steering flip flop 39 enables gate 35, a signal will be generated to cause thyristor 11 to conduct. The steering flip flop 39 is clocked by a signal on the Q output (line 34) of the commutation timing and pulse shaping circuit 30. Hence, the output of the commutation timing circuit 30 is coupled at each zero crossover of the thyristor current to a different thyristor. When thyristor 11 conducts, thyristor 12 is non-conducting, and capacitor 16 discharges through thyristor 11 and the primary of power transformer 20 (from left to right as seen in FIG. 1). At this time capacitor 17 charges through the conducting thyristor. The capacitors 16 and 17 form a tuned circuit with the inductance of the transformer 20 so that the resulting current is sinusoidal in nature.

When the thyristor current next passes through zero, the zero crossover detecting circuit 31 triggers the commutation timing and pulse shaping circuit 30 again, and the pulse 37 is again generated on lines 33 and 34. As mentioned, a "0" signal on line 33 inhibits the gates 35, 36; and the signal on line 34 toggles the steering flip flop 39 so that when the pulse 37 returns to its quiescent state and the pulse 44A is generated, the resulting signal from whichever of the gates 35, 36 is enabled at that time, is coupled to the corresponding driver 45, 46 to actuate it.

In the next succeeding cycle, the steering flip flop 39 is clocked to a complementary state; and the current through transformer 23 is reversed so that the other thyristor conducts, reversing the current through the power transformer 20. In this manner, oscillation is sustained in the inverter circuit. In this sense, the word "inverter" is used to mean that the full wave rectified signal generated by the circuit 13 (120 half-sinusoidal cusps per second) is converted to a much higher frequency signal, of the order of 20–25 KHz.

As one cusp of the full-wave rectified power signal reduces toward zero, the voltage will ultimately be insufficient to sustain commutation, and this will continue until the voltage again builds up during the next cusp. During this inter-cusp period, a re-strike pulse generator 50 generates a periodic signal to a set input S of the commutation timing and pulse shaping circuit 30 to generate an output pulse because thyristor current is not flowing during this period, and there is no signal on the leads X-X. Hence, the commutation timing and pulse shaping circuit 30 is not clocked along the lead 32. The period of the re-strike signal is approximately twice the period of a normal oscillation cycle of the inverter. The Q output signal of the commutation timing and pulse shaping circuit 30 on line 34 is used to reset the re-strike pulse generator 50. Thus, during normal inverter operation, there is no output signal from the re-strike pulse generator since it is reset before its period times out.

The signal designated Y which is representative of voltage in the inverter is coupled to a lamp voltage sensor circuit 51, the output of which is also fed to the input of the commutation timing and pulse generating circuit 30 to extend the width of the pulse 37 and thereby delay turning the thyristors on as the magnitude of the sensed voltage increases. This reduces the voltage applied to the lamps during warm-up and extends lamp life. A reference voltage generator 53 generates a reference signal for the lamp current sensor 38, the lamp over-voltage sensor circuit 51, and the fault protection circuits to be described presently. The reference signal is inhibited for a short period by the initialization circuit 42 during start-up, as will be further described below.

The fault protection circuits include a primary power loss sensor 52 which receives the signal V which is derived from the output of the full wave rectifier 13, and it generates an output signal coupled to a gate 54 if one or more cycles of primary power are lost. A lamp over-voltage detector 55 is responsive to a signal Y' representative of excessive voltage build up in the resonant circuit. If this signal lasts a predetermined time and exceeds a reference signal, an output signal is generated to inhibit inverter operation. This protects against excess voltage at the lamp socket, such as might otherwise occur if a lamp were removed or became defective.

A final fault detection circuit is indicated at 56, and it is a thyristor over-current detector, which generates an output signal coupled to the gate 54 if the signal F exceeds a predetermined limit. The signal F is representative of the current flowing in thyristor 12; and the fault condition may occur, for example, if both thyristors are conducting at the same time or if the system is in a no load condition. The output of the detector 56 is also used to cause a thyristor 57 to conduct which will turn off both thyristors 11, 12. A fourth signal coupled to the gate 54 is received from the power on reset circuit 59, the output of which is also used to reset a Fault Count Circuit 60 via a line 61.

If any of the detectors 52, 55 or 56 senses its associated fault, it generates a signal; and that signal is coupled through gate 54 to the initialization circuit 42 to inhibit the inverter from operating and force the system to re-initialize. Similarly, when power is first turned on, the power on reset circuit 59 generates a similar signal coupled through the gate 54 to the initialization circuit 42. The output signal of the gate 54 is also coupled to the count input C of the fault count circuit 60. The fault count circuit 60, in the illustrated embodiment, includes a digital counter which latches at a predetermined count, but which contains an internal timing circuit to cause it to reset if that predetermined count is not reached in a preset time. Thus, if a predetermined number of faults is detected during the preset time, the fault count circuit 60 generates an output signal on line 62 to a gate 63. The count in the fault count circuit 60 is reset to zero at the end of a time delay defined by the power on reset circuit 59.

A second input to the gate 63 is received from the re-strike pulse generator 50, but this signal is a pulse signal, not a voltage level. A third input signal of the gate 63 is received from the output of the initialization circuit 42.

During normal operation, when power is first turned on, an initial pulse of predetermined width is generated by the power on reset circuit 59. This signal resets the fault count circuit 60, and it also transmits a pulse through gate 54 to reset the initialization circuit 42, the output of the initalization circuit 42 is a signal of predetermined time (approximately 0.5 sec.) and it performs the following functions:

(A) It inhibits the operation of gates 35 and 36, thereby inhibiting oscillation of the inverter.

(B) It inhibits the subsequent transmission of any signal through the gate 63 for the duration of the output signal so that the initialization circuit cannot be re-triggered during this period.

(C) It clamps the reference voltage of the lamp current sensor circuit 38 so that its output is low which will force the commutation timing and pulse shaping circuit 30 to generate a delay pulse 37 of maximum width and thus force the inverter to operate at minimum output power.

When the output signal of the initialization circuit returns to its quiescent state, the gates 35, 36 are enabled, and the reference voltage for the lamp current sensor circuit 38 is caused to ramp toward its normal value to permit the lamp filaments to heat up before normal operation begins. If the predetermined number of faults mentioned above are counted in the fault count circuit 60, its output on line 62 latches the gate 63 in an inhibit state. This, in turn, causes the initialization circuit 42 to generate a constant inhibit signal to the gates 35, 36, thereby terminating oscillation of the inverter which cannot be re-started unless power is removed and the power on reset circuit 59 resets the fault count circuit 60. This might occur for intermittencies in primary power (detector 52), lamp failure (detector 55), or thyristor punch through (detector 56).

II. Detailed Circuit Description

Figure 3:
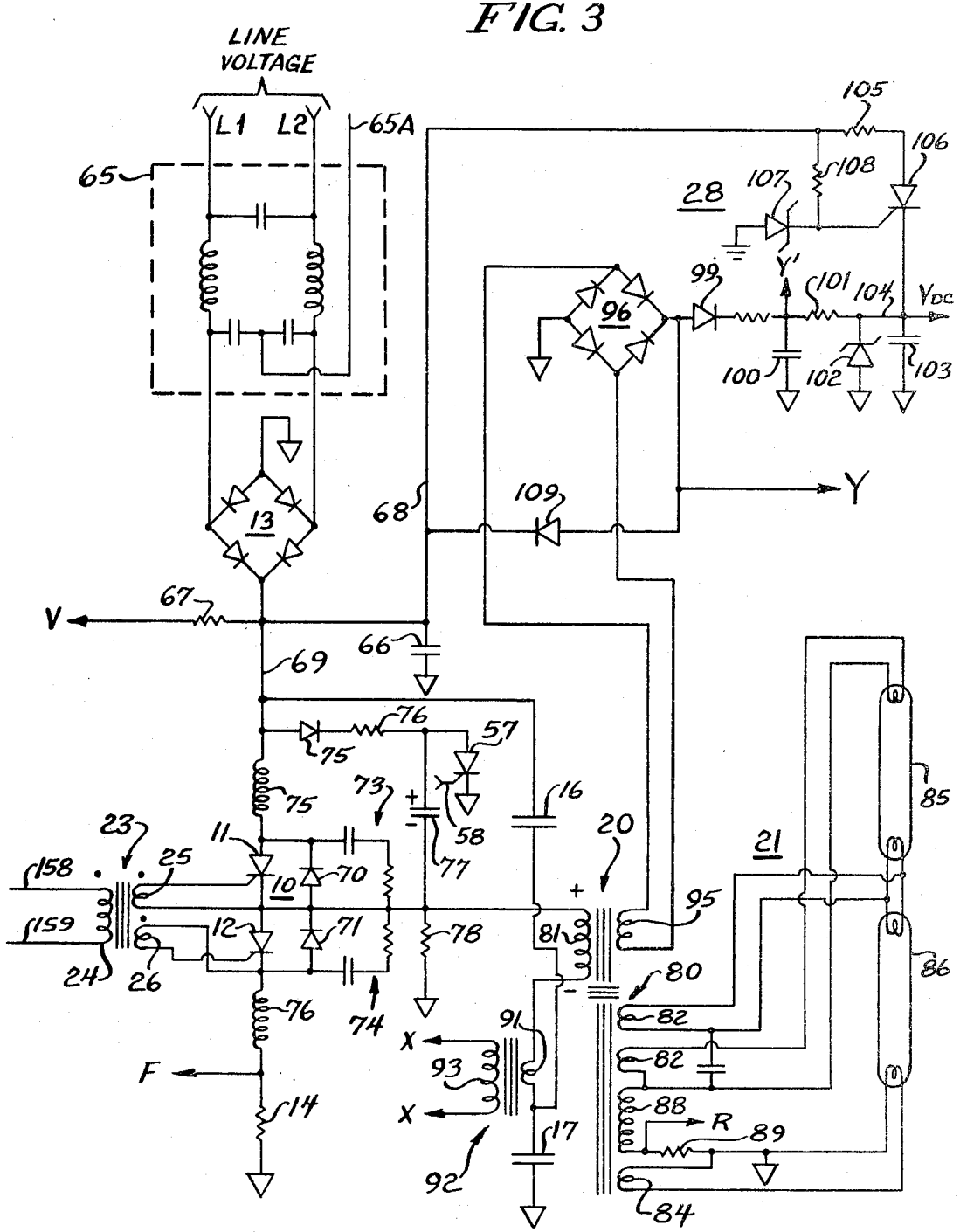
FIG. 3 is a circuit schematic diagram of the power stage of the system of FIG. 1.

Referring now to FIG. 3, the power stage for a two-lamp fluorescent system is illustrated. Referring first to the upper left hand corner, the 60 Hz. line voltage is connected to lines L1 and L2 respectively; and they couple input power to a conventional EMI filter enclosed within the dashed line 65. A ground line is connected as at 66. The output of the EMI filter 65 is fed to opposite diagonal nodes of the full wave rectifier circuit 13. The output voltage of the bridge 13 is connected to a capacitor 66, the other terminal of which is connected to the circuit common (hereinafter referred to as ground, although it is not a ground for the input line power), and through a resistor 67 to generate the voltage signal V. The output of the rectifier bridge 13 is also connected by means of a line 68 to the low voltage supply 28 and by means of a line 69 to the inverter circuit including thyristors 11 and 12. Commutating diodes 70, 71 are connected repsectively across the power thyristors 11, 12 in opposite polarity to carry the reactance current and to limit any inverse voltage across the thyristors. A series resistance/capacitance circuit is connected across each thyristor to limit the rate of change of voltage. Such resistance/capacitance circuits are known in the art, being commonly referred to as "snubber" circuits; and they are generally designated respectively 73 and 74 in FIG. 3. Inductances 75, 76 are placed in series with the thyristors 11, 12, to limit the rate of change of current through them and their associated commutating diodes.

Turning now to the circuitry associated with the previously described thyristor 57, a diode 75 is connected from the output of the rectifier bridge 13 via resistor 76 to the anode of thyristor 57, the cathode of which is grounded. A capacitor 77 is connected between the anode of thyristor 57 and the junction between the power thyristors 11, 12; and a resistor 78 is connected from that junction to ground.

As previously mentioned, the function of thyristor 57 is to commutate the main power thyristors 11, 12 in the event that the thyristor over-current detector 56 detects a fault as represented by the signal F. In this case, a signal is generated along lead 58 to cause thyristor 57 to conduct. Prior to that time, a charge will have built up on capacitor 77 through diode 75 and resistor 76 in the polarity illustrated. The fault detected is a large current flowing in the thyristor circuit (e.g. the circuit is unloaded or a thyristor becomes shorted). When the thyristor 57 conducts, the positive terminal of capacitor 77 is grounded, thereby placing a negative voltage on the junction between the power thyristors 11, 12. The voltage on capacitor 77 opposes the current flowing through inductor 76; and that current will eventually reduce to zero, at which time thyristor 12 is commutated to a non-conducting state.

At that time, current still flows through inductance 75 and power thyristor 11 to begin charging capacitor 77 in the opposite polarity. Further, since the inverter is still in an oscillating state, the voltage across inductance 75 and thyristor 11 will reverse polarity, and when it reaches its negative peak, the current flowing through thyristor 11 and capacitor 77 will reduce to zero. During the next half cycle of inverter oscillation, the charge on capacitor 77 will be of a polarity inverted from that illustrated and cause current to flow through the commutating diode 70, while the current in the thyristor 11 remains at zero. This will commutate the thyristor 11.

In order to prevent excessive currents in the lamp circuit 21, it is desirable, in case of fluorescent lamps, to employ a power source of relatively high output impedance. This is achieved in the illustrated embodiment by using a power transformer 20 which has a high leakage flux around the secondary by means of a shunt, diagrammatically illustrated at 80. The primary 81 of power transformer 20 is connected between the diagonal nodes of the inverter bridge comprised of the power thyristors 11, 12 and the balanced capacitors 16, 17 described previously. The shunt secondary of power transformer 80 includes heater windings 82–84 which are connected, as illustrated, to the heater windings of two fluorescent lamps 85, 86. A secondary winding 88 is connected across the series circuit comprising the lamps 85, 86; and a resistor 89 is connected in this circuit for generating the previously described signal R which is a voltage signal fed to the lamp current sensor circuit 38 of FIG. 1 representative of the current flowing in the lamps 85, 86. A winding 91, which is a primary winding of a transformer 92, is connected in series with the primary 81 of the power transformer 20 in order to generate the previously described signal on the lines XX on its secondary 93, which signal is coupled to the zero crossover detector 31 of FIG. 1.

Turning now to the low voltage supply circuit 28, the transformer 20 also includes a closely-coupled secondary winding 95, the terminals of which are connected to a second rectifying bridge circuit 96. One of the output terminals of the bridge circuit 96 is grounded, and the previously described voltage signal Y which is coupled to the lamp voltage sensor circuit 51, is derived from the other output terminal of bridge circuit 96. This terminal is also connected through a resistor 99 to a filter capacitor 100, across which is connected to a resistor 101 and a Zener diode 102. The signal Y' fed to the fault detector 55 may be derived from the capacitor 100. A second capacitor 103 is connected across the Zener diode 102; and the common junction designated 104 forms the output terminal for the low voltage supply, denoted $V_{DC}$.

The output rectified voltage of the main bridge circuit 13 is fed through a resistor 105 and a thyristor 106 to the junction 104. The gate lead of thyristor 106 is connected to a Zener diode 107, the other terminal of which is grounded; and a resistor 108 provides bias voltage to the Zener 107 and gate of thyristor 106.

When the system is first turned on, the inverter is inhibited from operating by action of the initialization circuit 47, described in connection with FIG. 1. Thus, there is no signal during this period from the secondary winding 95 to the bridge circuit 96. The thyristor 106 will conduct because the Zener 107 will conduct at 12 v. Thus, a charge will build up on capacitors 103 and 100. This will permit the DC supply voltage to build up to approximately eleven volts very quickly to supply power for the logic circuitry. When the inverter begins to oscillate, after the gates 35, 36 of FIG. 1 become enabled, power will be coupled through the secondary 95 of the power transformer 120 and the bridge circuit 96 to generate a DC supply voltage at the junction 104 (determined by the breakdown voltage of Zener diode 102) which is approximately equal to or slightly higher than the gate voltage for thyristor 106. Hence, the thyristor 106 will become non-conducting and the low voltage supply will be generated by the bridge 96. This circuitry reduces power consumption in the dropping resistor 105, while permitting the generation of a low voltage supply when the system is switched on.

A diode 109 is connected as shown between the outputs of the low voltage supply bridge 96 and the main power bridge 13. During the inter-cusp period, the output of bridge 13 reduces to a point where the lamps will not conduct, but the inverter remains oscillating due to the transfer of power via diode 109.

Figure 2:
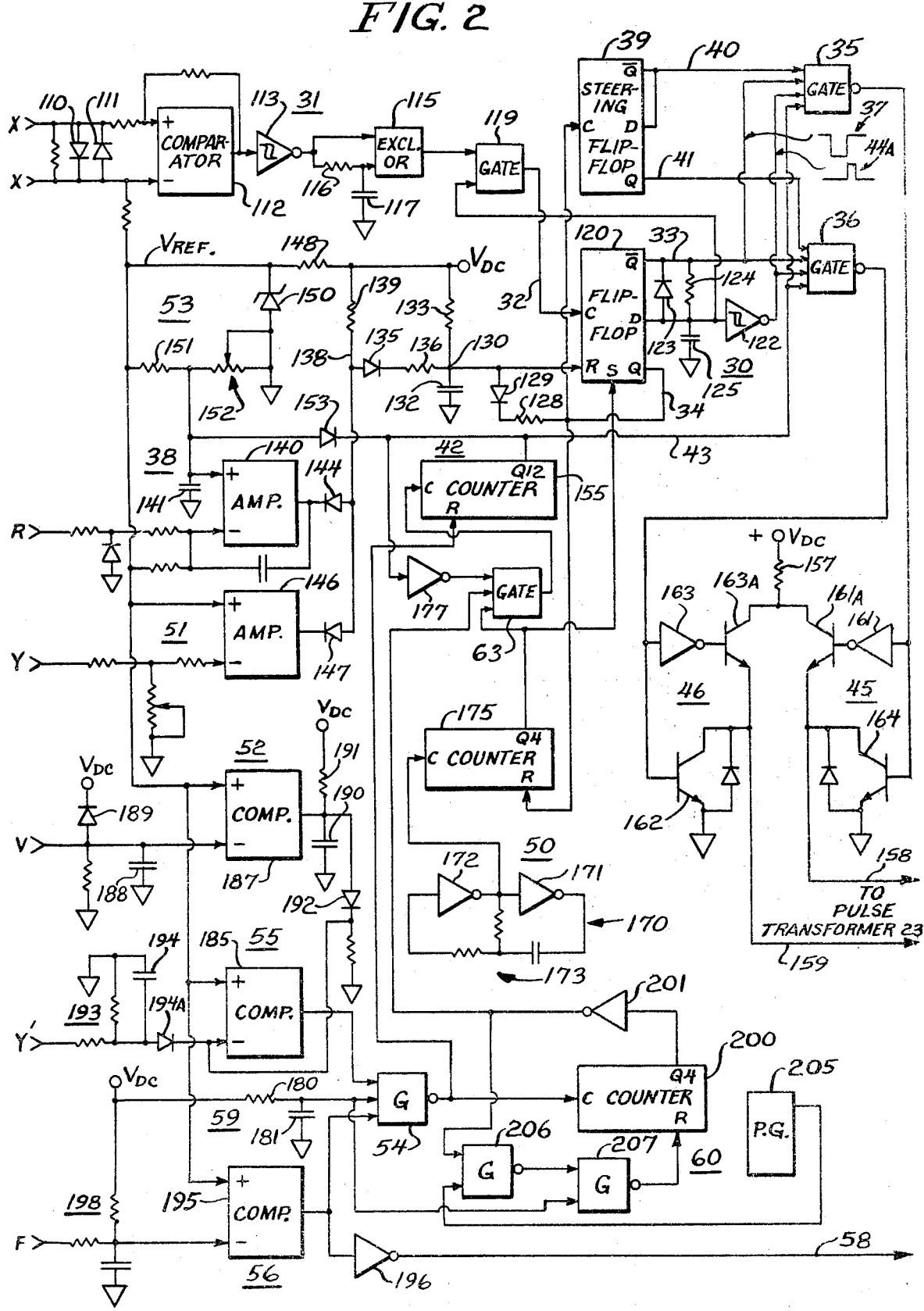
FIG. 2 is a detailed circuit schematic diagram of the logic and control circuitry of the system of FIG. 1.

Turning now to FIG. 2, and particularly to the upper left hand portion, the zero crossover detection circuit 31 will now be described in more detail. As already indicated, a signal is received from the secondary 93 of the transformer 92 along the leads XX. This voltage signal is clipped by means of diodes 110, 111 and fed to the inputs of a comparator circuit 112. The output of the comparator 112 is fed through an inverting Schmitt trigger circuit 113 to an exclusive "OR" logic gate 115.

One of the inputs of the exclusive OR circuit 115 contains a "proportioning" circuit including a resistor 116 and capacitor 117. The output of the exclusive OR gate 115 is connected to one input of a gate 119. Unless otherwise indicated, a "gate" as used herein is a NAND gate. The other input of the gate 119 is received from a pulse shaping circuit (to be described) connected to the Q output of a "D-type" flip flop 120 which is part of the commutation timing and pulse shaping circuit 30. The output of the gate 119 is fed to the clock input C of the flip flop 120.

The D input of flip flop 120 is connected to the $\overline{Q}$ output of the same flip flop by means of a diode 123 in the polarity shown and a resistor 124. A capacitor 125 is connected between the D output of flip flop 120 and ground. As will be described more fully below, it is this circuitry which determines the width of the output pulse that causes the thyristors to conduct. The output of this pulse shaping circuit is also connected to an input of gate 119.

The Q output of flip flop 120 is connected to the clock input of steering flip flop 39, as discussed; and is also connected by means of a resistor 128 and a diode 129 to a junction 130 which is directly connected to its own reset input.

A capacitor 132 is connected between the junction 130 and ground; and a resistor 133 is connected between the low voltage supply and the junction 130. A diode 135 and a resistor 136 are connected between a junction 138 and the junction 130; and a resistor 139 is connected between the low voltage power supply and the junction 138.

The lamp current sensor circuit 38 includes a linear differential amplifier 140 having its positive input terminal connected to a reference voltage derived from the reference voltage generator 53, and including a capacitor 141 connected to ground. The negative input terminal of the amplifier 140 is connected through a bias network to the previously described signal R derived from the resistor 89 in the lamp circuit. The output of the amplifier 140 is connected by means of a diode 144 to the junction 138.

The lamp voltage sensor circuit 51 includes a similar differential amplifier 146 having its positive input terminal connected directly to the reference voltage and its negative input terminal connected through a bias network to the previously described signal Y. The output of the amplifier 146 is connected by means of a diode 147 to the junction 138.

The reference voltage generator 53 includes a dropping resistor 148 directly connected to the low voltage power supply, $V_{DC}$, and is derived across a Zener diode 150. The reference at the positive input of amplifier 140 includes a fixed resistor 151 and a potentiometer 152, the junction between which is directly connected by means of a diode 152 to the output of a counter circuit 155 forming the principal element of the previously described initialization circuit 42.

With reference to the timing diagram of FIG. 4, the operation of the circuitry of FIG. 2 thus far described, will be explained. The signal on lines XX representative of thyristor current is shown in idealized form on line L1 of FIG. 4. That signal is coupled to the zero crossover detection circuit 31 which clips it by means of diodes 110, 111 and squares it in comparator 112 and Schmitt trigger 113. The resulting signal, seen again in idealized form on line L2, is a square wave which is synchronized with the thyristor current. That signal is amplified and transmitted to the Exclusive OR gate 115. For each change of state of the output signal of the inverter 113, one input of Exclusive OR gate 115 responds immediately, but the other input receives a signal which is delayed slightly by the proportioning circuit comprising resistor 116 and capacitor 117. Thus, for a short time, determined by the time constant of the resistor and capacitor, the inputs of the Exclusive OR gate 115 are in different logic states, and an output pulse is generated as seen on line L3 of FIG. 4. This signal is coupled to gate 119.

The gate 119 is enabled by the $\overline{Q}$ output of flip flop 112 fed through the pulse shaping circuit, indicating that the flip flop 120 is in its normal or quiescent state. When this is so, the pulse from the gate 115 is fed through gate 119 to clock flip flop 120, the $\overline{Q}$ output of which is seen on line L5 of FIG. 4. Thus, the flip 120 is clocked every time the thyristor current crosses zero. In other words, the flip flop 120 is clocked twice for each complete cycle of inverter oscillation (compare lines L1 and L5).

Under normal operation, the Q output of flip flop 120 is a logic "0" (that is, relatively low voltage or ground level). In this state, the junction 130 is held at a "0" by diode 129. When flip flop 120 is clocked, its Q output becomes a logic "1". This signal clocks the steering flip flop 39 and also removes the clamp from capacitor 132 by reverse biasing diode 129. Thus, capacitor 132 begins to charge towards a level $V_{DC}$. The amount of time that it takes for the junction 130 to charge to a potential that will reset flip flop 120 depends not only on the values of resistor 133 and capacitor 132, but also on the values of resistors 139 and 136, and the potential at junction 138. The signal at junction 138 is the output of amplifiers 140, 146 coupled through diodes 144, 147 respectively, which diodes act as an OR gate.

If the current flowing in the lamps is relatively high (in relation to a nominal or design value), then the signal R will also be relatively great, thereby causing the output of amplifier 140 to decrease. This will cause the voltage at junction 138, coupled through diode 144, to decrease and thereby increase the charge time of capacitor 132 by reducing its charging current. Since it is the voltage on capacitor 132 that resets flip flop 120, the longer it takes to charge the capacitor 132, the longer will be the delay (or "commutation time") between a zero crossing detection and the gating or commutation of the thyristor which has been selected by the steering flip flop 39. To summarize, the greater the lamp current, the longer will be the delay time for resetting flip flop 120. A longer delay time reduces lamp current in the next half cycle of inverter oscillation. The signal at junction 130 is seen in an idealized form on line L4 of FIG. 4. When it reaches sufficient magnitude to reset the flip flop 120, the $\overline{Q}$ output of that flip flop (line L5) goes positive. From the foregoing, it will be appreciated that the timing of the resetting of flip flop 120 varies within a range having a minimum time (corresponding to a low value of sensed lamp current) which is determined by the values of resistors 139 and 136 as well as resistor 133 and capacitor 132, to a maximum time which is determined by the value of resistor 133 and capacitor 132 alone. This range is diagrammatically illustrated by the arrow 153 in line L5 of FIG. 4. The minimum time of this range is greater than the turn off time of the thyristors so that they can be commutated off before a new cycle begins. When the flip flop 120 is reset by the charging of capacitor 132, the signal on the $\overline{Q}$ output (line L5 of FIG. 4) returns to logic "1". This signal is fed to the gates 35, 36 as an enable signal. This causes the output of gate 36 to go to "0" assuming flip flop 39 has a "1" on its Q output, as seen on line L9 of FIG. 4. This same signal also causes capacitor 125 to begin to charge through resistor 124 as shown at 154 on line L6 of FIG. 4. When the voltage on capacitor 125 is sufficient to change the state of the Schmitt trigger circuit 122, its output goes to "0", as seen at 154A on line L7 of FIG. 4. Thus, the width of the output signal is determined by the values of the resistor 124 and capacitor 125, which are selected so that the output signal has a nominal width of four microseconds, sufficient to gate the thyristors on. The gates 35, 36 are enabled in alternate half cycles of the inverter current (line L1) by the output of the steering flip flop 39, the Q output of which is seen on line L8 of FIG. 4. It will be observed that in the next succeeding half cycle of inverter current, an actuating pulse is transmitted through gate 35, the output of which is seen on line L10 of FIG. 4.

When the flip flop 120 is reset, the Q output goes to logic zero, thereby clamping capacitor 132 again. The function of gate 119 is to prevent successive triggers from clocking flip flop 120, and thereby reduce the sensitivity of the system to spurious signals or noise. Thus, the output signals of the gates 35, 36 are each normally a logic "1". When all of the inputs to one of these gates become logic "1", the output goes to a logic "0". This signal is coupled to the dual drivers 45, 46 to generate the thyristor gating signal. For example, when the output of gate 35 goes to "0", it is fed through an inverter 161 to cause a transistor 161A to conduct, thereby coupling the positive voltage of supply $V_{DC}$ to line 158. Since the output of gate 36 is a "1" at this time, the line 159 is coupled to the circuit common through a conducting transistor 162. Similarly when the output of gate 36 goes to "0", the polarity of the signal on lines 158, 159 is reversed by inverter 165 and transistor 163A while lead 158 is connected to common by transistor 164.

A similar regulating effect on thyristor current is obtained from the amplifier 146 which comprises the principal element of the lamp voltage sensor circuit 51. This circuit is not essential to circuit operation since its function is somewhat duplicated by the detector 55, as persons skilled in the art will appreciate.

The negative input to the amplifier 146 is received through a biasing network as the signal Y which is derived from the output of the rectifier bridge 96 which is directly connected to the secondary winding 95 of the power transformer 20, as seen in FIG. 3. The diodes 144, 147 isolate the outputs of differential amplifiers 140, 146 from the junction 138. The circuitry just described permits whichever signal is lower from the amplifiers 140, 146 to have an effect on the charge time of capacitor 132. In normal operation, it is the output of the lamp current sensor circuit 38 which defines the charge time of capacitor 132, and thus the commutation time of the thyristors.

Turning now to the re-strike pulse generator 50, it includes a conventional oscillator circuit generally designated 170 and including inverters 171, 172 and a feedback or delay circuit generally designated 173 in a conventional arrangement. The output of the oscillator is fed to the clock input of a digital counter circuit 175. In the illustrated embodiment, the counter 175 is a four-bit counter; and it is used as a resettable timer. That is, it generates an output signal when it has counted a predetermined number of pulses from the oscillator. The Q-4 output is directly connected to the set input of the flip flop 120, as well as to one input of gate 63.

The frequency of the oscillator 120 is set to be approximately twice the frequency of oscillation of the inverter. Hence, the counter 175 will be reset by the output of flip flop 120 before it counts enough pulses from the oscillator 170 to generate an output, provided the inverter is oscillating. When the inverter stops oscillating, however, as during the inter-cusp period, the counter 175 will generate an output signal causing flip flop 120 to set, in an effort to re-start oscillation. The function of the circuitry just described including the oscillator 170 and counter 175 could equally well be performed by an astable analog timer generating an output pulse having a duration longer than the period of inverter oscillation, and capable of being reset.

As indicated, the output of the counter 175 is coupled through gate 63 (assuming it is enabled), to the input of counter 155. The output of counter 155 is selected so as to generate an output signal in approximately 0.36 seconds. Briefly, the counter 155 and associated circuitry operate as follows. During start up, the counter 155 is reset so that all of its outputs are "0". A "0" on the Q12 output of counter 155 inhibits the gates 35, 36 (and therefore prevents inverter oscillation), and it also clamps capacitor 141 to ground via diode 153. This prevents the capacitor 141 from charging and this causes amplifier 140 to have a "0" output. The signal from the Q12 output of counter 155 is also coupled through inverter 177 to gate 63 to inhibit that gate after the initialization period. After a predetermined number of such pulses have been counted (enough to insure the 0.36 sec. delay), the Q12 output of counter 155 becomes a "1"; and the gates 35, 36 are enabled. The same signal unclamps capacitor 141 and permits it to ramp up to the designed reference voltage at which time current sensor 38 is permitted to function normally. During the ramp period, power is supplied to the lamp heater filaments, but lamp current builds up more slowly. This reduces the undesirable effects of a "cold" start.

Turning now to the circuitry associated with gate 54, and particularly the fault detection circuitry, it will be observed that all of the inputs to gate 54 are normally at logic "1" levels. If any one of these inputs goes to a logic "0", the output of gate 54 goes to a "1"; and this signal resets counter 155. This action, in turn, causes the Q12 output of counter 155 to go to "0", thereby instituting a new initialization cycle by inhibiting gates 35, 36 and clamping capacitor 141 of the lamp current sensor circuit 38. This continues for the full delay time of the initialization circuit 42.

One of the inputs to gate 54 is received from the power on reset circuit 59 which includes a resistor 180 and capacitor 181 connected in circuit as illustrated and energized by the low voltage power supply. When the system is first turned on, the capacitor 181 charges through resistor 180, and before it fully charges, it will have caused the output of gate 54 to generate a "1" logic signal.

Another input to gate 54 is received from a comparator circuit 185 which forms a principal element of the thyristor over-voltage detector 55. It will also be appreciated that the output signal of the primary power loss detector 52 is conjunctively joined with the over-voltage detector such that if either condition is sensed, the output of comparator 185 will become a logic "0", and cause an initialization cycle to commence.

To explain the operation of the power loss detector 52, the output signal of the bridge rectifier 13 is coupled through the resistor 67 of FIG. 3 to provide the voltage designated V. This signal, as already indicated, is a series of positive cusps at a frequency twice the frequency of the line voltage. It has a value larger than that of the DC supply during most of its cycle. Hence, the signal V, which is coupled directly to the negative input of a comparator circuit 187, the positive input of which is the reference voltage $V_{REF}$, will, under normal conditions, cause the comparator 187 to generate a "0" at its output. A capacitor 188 connected to the negative input terminal of the comparator 187 acts to filter out voltage spikes, and a diode 189 acts to limit the magnitude of the applied voltage. If one or more cycles of line power are lost, the output of the comparator 187 goes to a "1", thereby permitting a capacitor 190 to charge through a resistor 191. It will be recalled that sufficient charge is stored in capacitor 100 of the low voltage power supply 28 that the logic circuit supply voltage is not lost with the loss of only a few cycles of AC line voltage. Thus, a logic "1" signal is coupled through a diode 192 to the negative input of comparator 185, causing its output to change from a normal "1" to a "0". This signal, in turn, causes the gate 54 to generate a signal to reset the counter 155 as already described.

A similar result is achieved if the voltage signal Y', which it will be recalled is representative of lamp voltage, exceeds the reference voltage of comparator 185. The signal Y is coupled through a delay circuit comprising a divider 193 and a capacitor 194. If a lamp overvoltage condition persists for a predetermined time defined by the charge time constant of capacitor 194, comparator 185 will change states.

It will thus be apparent that the difference between the lamp voltage sensor circuit 51 and the lamp overvoltage detector 55 is that the former is responsive to an instantaneous voltage to reduce power delivered by the inverter during cold starts whereas the latter samples the lamp voltage and if an excess condition persists for a predetermined time, it forces the system to stop oscillation and to start a new initialization cycle in contemplation that the fault will have abated. The primary functions of the detector 55 are to shut off the inverter when a lamp has been removed from its socket, to sense excessive starting voltages on lamps that have reached end of life, and to make the circuit safer by removing excessive voltages at the lamp socket.

The third input of gate 54 is received from a comparator circuit 195, having its positive input connected to the reference voltage and its negative input being the previously described signal F which is representative of thyristor current. If thyristor current exceeds a predetermined threshold, as determined by the value of the components of a bias network 198, the comparator 195 will have its output signal changed to a "0", and thereby cause gate 54 to institute an initialization cycle. The output signal of comparator 195 is also coupled through an inverter 196 to lead 58 to cause previously described thyristor 57 to conduct, thereby commutating the main power thyristors 11 and 12 as described above.

Turning now to the fault count circuit 60, it includes a counter circuit 200 which is clocked by the output of the gate 54 each time a fault is detected in the fault detection circuitry. The counter 200 preferably is a latching counter (that is, it does not re-cycle when it reaches the selected count). The counter is, however, reset in a predetermined period, such as 0.5 min. If a predetermined number of faults (such as eight) is detected within the preset period (0.5 min.), then the output of counter 200 is coupled through an inverter 201 to disable gate 63. This has the effect of preventing further initialization cycles until power is removed.

The preset period for resetting the counter 200 is generated by a pulse generator or timer circuit 205, the output of which is fed through a gate 206 and a gate 207 to reset the counter 200. A second input of the gate 206 is received from the output of inverter 201. Hence, if the predetermined fault count is reached, the gate 206 is inhibited so that the counter 200 cannot be reset. A second input of the gate 207 is received from the power on reset circuit 59. This gate is inhibited until the low voltage supply has reached a quiescent state. This has the effect of reducing fault counts during initial start up.

Turning now to FIGS. 5 and 6, lamp load circuits are illustrated for a three lamp load and a four lamp load respectively. The lamps illustrated are fluorescent lamps.

In FIG. 5, the lamps are designated LL1, LL2 and LL3; and they are connected in series, with the filaments of adjacent ends connected in parallel. The power transformer is generally designated by reference numeral 20A, and again includes a primary 81 and a secondary 95, similar to those which have already been described.

In addition, the transformer 20A includes four filament windings 220, 221, 222 and 223 connected as illustrated. The signal R, representative of lamp current is generated by sensing the current through a resistor 224 which is connected in series with a secondary winding 225 which supplies power to the lamps.

A first starter capacitor 226 is connected across lamp LL1; and a second starter capacitor 227 is connected across both lamps LL1 and LL2.

In starting the lamps in the circuit of FIG. 5, as voltage builds up across the secondary winding 225, capacitor 226 shorts out lamp LL1, in effect; and capacitor 227 provides a low impedance across both lamps LL1 and LL2. Thus, substantially all of the voltage developed across the secondary 225 is applied to lamp LL3; and it will conduct first. When it conducts, voltage builds up across lamp LL2 until it conducts; and finally, lamp LL1 conducts.

Referring now to FIG. 6, the four lamps are designated respectively LL1, LL2, LL3 and LL4. Lamps LL1 and LL2 are connected in series with a resistor 230, across which the signal R is generated; and lamps LL3 and LL4 are similarly connected in series with a resistor 231.

The power transformer is generally designated 20B and it is similar to previously described power transformers in structure, but two additional filament windings have been added, as illustrated.

The power secondary 234 has one terminal connected to ground and the other terminal connected to the center tap of an interphase transformer generally designated 235. The function of the interphase transformer 235 is to balance the currents in the two lamp circuits. If one of the series lamp circuits breaks down first, the increase in current flowing in the corresponding portion of the transformer 35 will increase the voltage in the other portion of the transformer, thereby increasing the voltage across the series lamps which have not broken down. Further, a starting capacitor 238 is connected across lamp LL3 so that lamp LL4 will conduct first; and a similar capacitor 239 is connected across lamp LL1.

Other configurations of power transformers and lamp circuits may easily be conceived by persons skilled in the art, but the control and fault circuitry described above have equal application to all such modifications.

It will also be appreciated that the illustrated embodiment may easily be modified to accommodate additional features if desired. For example, manual dimming may be accomplished by permitting access to the potentiometer 152 of FIG. 2 so that it can be manually adjusted. This has the effect of varying the reference voltage to the current regulating amplifier 140, thereby chaging the nominal or reference value of the commutation timing of the circuit. Still further, the automatic light sensing could be incorporated by sensing the ambient light level and controlling the power to achieve a predetermined output light level. Such a system would reduce energy consumption when ambient light was sufficient for the particular task desired.

Still further, the resistor 89 in the secondary of transformer 20 in FIG. 3 could be a current transformer for generating the signal R.

It is also recognized that the control, safety, power-consumption and fault-detection circuitry described above has equal application to high-intensity discharge application. However, in such applications there is a need to regulate the power coupled to the lamp load rather than to regulate the current, as in the illustrated embodiment. Obviously, other circuit modifications such as changing component values and voltages may have to be accomplished, depending upon the particular application.

Having thus disclosed in detail preferred embodiments of the invention, persons skilled in the art will be able to make additional modifications of that illustrated embodiment and to substitute equivalent elements for those disclosed while continuing to practice the principal of the invention; and it is, therefore, intended that all such modifications and substitutions be covered as they are embraced within the spirit and scope of the appended claims.

I claim:

1. An inverter circuit receiving power from a power source and generating a high frequency inverter signal for energizing gaseous discharge lamp circuit means comprising: control switching means connected in circuit with said power source and said lamp circuit means; reactive circuit means connected in circuit with said switching circuit means and said lamp circuit means for causing current flowing therein to oscillate at high frequency; driver circuit means for triggering said control switching means to conduct and thereby generate said high frequency oscillation in said lamp circuit means; first detector circuit means responsive to signals in said lamp circuit means for generating a timing signal in timed relation with said inverter signal; a current sensor circuit means for generating a current sensor signal representative of the magnitude of high frequency current flowing in said lamp circuit means; and commutation circuit means responsive to said timing signal and said current sensor signal for actuating said driver circuit means to trigger said control switching means in predetermined time relation with said inverter signal to regulate the high frequency current in said lamp circuit means.

2. The apparatus of claim 1 further comprising voltage sensor circuit means responsive to the voltage applied to said lamp circuit means by said inverter circuit for generating a voltage sensor signal, said commutation circuit means being further responsive to said voltage sensor signal to regulate the current in said lamp circuit means.

3. The apparatus of claim 1 further comprising second detector means responsive to the current in said control switching means for disabling said driver circuit means when said control switching means current exceeds a predetermined value.

4. The apparatus of claim 1 further comprising third detector circuit means including delay circuit means responsive to the voltage applied to said lamp circuit means for inhibiting said driver circuit means when said applied lamp circuit means voltage exceeds a predetermined value for a predetermined time.

5. The apparatus of claim 1 wherein said power source is an alternating line source and said control switching means comprises first and second control switching means, said apparatus further comprising rectifier circuit means receiving voltages from said line source for rectifying the same and for applying a rectified voltage to said first and second control switching means connected in series; and power loss detector circuit means responsive to the absence of said rectified voltage across said control switching means for inhibiting said driver circuit means.

6. The apparatus of claim 1 wherein said control switching means comprises first and second control switching means connected in separate branches of a bridge circuit; first and second capacitors connected in separate branches of said bridge circuit; and power transformer means connected in the diagonal branch of said bridge circuit for energizing said lamp circuit means, the frequency of oscillation of said inverter signal being determined by the capacitance of said first and second capacitors and the inductance of said power transformer.

7. The apparatus of claim 6 further comprising initialization circuit means for disabling said driver circuit means for a predetermined initialization period of time to permit the circuitry to stabilize in response to the initial application of power to said inverter circuit.

8. The apparatus of claim 7 further comprising reference voltage generator means for generating a reference voltage, said current sensor circuit means being further responsive to said reference voltage signal for generating said current sensor signal.

9. The apparatus of claim 7 wherein said lamp circuit means includes filaments energized by said inverter signal, and wherein said initialization circuit enables said driver circuit means after said initialization period to thereby energize the filaments in said lamp circuit means, said initialization circuit means further controlling said reference voltage generator circuit means to increase said reference voltage to said current sensor circuit means over a predetermined time whereby after said initialization period, the filaments of said lamps are energized and the voltage across said lamps increases until said lamps conduct, said current sensor circuit means being responsive to said reference voltage for regulating lamp current.

10. The apparatus of claim 7 further comprising fault detection circuit means responsive to the detection of a predetermined fault in said inverter circuit means for generating a fault signal to actuate said initialization circuit means to inhibit said driver circuit means when such fault is detected.

11. The apparatus of claim 10 wherein said fault detection circuit means includes delay circuit means and is responsive to the voltage applied to said lamp circuit means for generating said fault signal when said applied voltage exceeds a predetermined value for a predetermined time.

12. The apparatus of claim 10 wherein said fault detection circuit means is responsive to current flowing in at least one of said first and second control switching means for generating said fault signal when said current exceeds a predetermined value.

13. The apparatus of claim 12 wherein said first and second control switching means are connected in series with each other and connected in a bridge circuit with first and second balance capacitors, said lamp circuit means being in a diagonal branch of said bridge circuit; said apparatus further including a diode and a capacitor connected in series across one of said first and second control switching means, said capacitor having a terminal connected to the junction between said first and second control switching means; third control switching means for connecting the other terminal of said capacitor to the system common when triggered; said fault detection circuit means further triggering said third control switching means when said current in said control switching means exceeds said predetermined value, whereby when said third control switching means conducts, the charge on said capacitor commutates said first and second control switching means to non-conducting states in sequence.

14. The apparatus of claim 10 further comprising rectifier circuit means receiving power from said line source for generating a rectified voltage and for applying the same to said inverter circuit means, and wherein said fault detection circuit means is responsive to the output of said rectifier circuit means for generating said fault signal when said rectifier circuit means fails to generate said rectified voltage.

15. The apparatus of claim 10 further comprising fault count circuit means for counting the occurrences of said fault signal in a predetermined time period and for disabling said initialization circuit means if said fault detection signal occurs said predetermined number of times within said time period thereby requiring manual resetting before said inverter circuit can operate thereafter.

16. The apparatus of claim 10 wherein said current sensor circuit means is responsive to a reference signal having a first value, and wherein said initialization circuit means clamps said reference voltage of said current sensor circuit means to a second value different than said first value for a predetermined time and thence permits said reference signal value to vary from said second value to said first value along a predetermined characteristic while permitting power to be applied to the filaments of said lamp circuit means whereby said lamp filaments are heated and the voltage applied to said lamps is increased according to said characteristic following said predetermined period.

17. The apparatus of claim 12 further comprising second fault detection circuit means sensing voltage applied to said lamp circuit means for generating a fault detection signal to actuate said initialization circuit means when said sensed voltage indicates that an operative lamp is not connected in said lamp circuit means.

18. The apparatus of claim 17 further comprising third fault detection circuit means responsive to the absence of power from said line source for generating a fault detection signal.

19. The apparatus of claim 1 wherein said lamp circuit means includes first, second and third fluorescent lamps connected in series; and starting capacitor circuit means connected in circuit with said lamps to cause said lamps to conduct in a predetermined sequence.

20. The apparatus of claim 1 wherein said lamp circuit means comprises four fluorescent lamps including first and second pairs of series-connected lamps, said pairs being connected in parallel; and starting capacitor circuit means for causing the individual lamps of each pair to conduct in predetermined sequence.

21. An inverter circuit for exciting gaseous discharge lamp means from AC line voltage including a main power bridge receiving and rectifying said line voltage; a thyristor/capacitor bridge circuit means receiving said rectified voltage and including first and second thyristors and first and second capacitors in respective branches of said bridge circuit means; and commutation circuit means for causing said first and second thyristors to conduct in alternate cycles of high frequency oscillation, said gaseous discharge lamp means being connected in the diagonal branch of said bridge circuit means, the improvement comprising: low voltage supply means for generating a DC potential to said commutation circuit means including second rectifier circuit means receiving power from said inverter circuit for generating said low voltage when said inverter circuit is oscillating; and current conduction means for coupling power unidirectionally from the output of said low voltage supply means to said thyristor/capacitor bridge circuit means to maintain the same in oscillation when the voltage output of said main power bridge falls below the voltage output of said low voltage supply means.

22. The apparatus of claim 21 further comprising capacitor means in said low voltage supply means for storing charge sufficient to maintain said inverter bridge circuit in oscillation during the inter-cusp period of said rectified line voltage.

23. An inverter circuit receiving power from an AC line source and generating a high frequency inverter signal for energizing gaseous discharge lamp circuit means comprising a balanced bridge circuit including first and second control switching means and first and second capacitors receiving power at line frequency from said line source and delivering power at said higher frequency to said lamp circuit means, said lamp circuit including inductive reactance circuit means for causing current flowing therein to oscillate at said higher frequency; driver circuit means for enabling said first and second control switching means to conduct in alternate half cycles and thereby generate said high frequency oscillation in said lamp circuit means; first detector circuit means responsive to signals in said lamp circuit means for generating a timing signal in timed relation with said high frequency signal; current sensor circuit means for generating a current sensor signal representative of the magnitude of high frequency current flowing in said lamp circuit means; and commutation circuit means responsive to said timing signal and said current sensor signal for actuating said driver circuit means to trigger the enabled one of said first and second control switching means in predetermined time relation with said inverter signal to regulate the high frequency current in said lamp circuit means.

24. The apparatus of claim 23 further comprising voltage sensor circuit means responsive to the voltage applied to said lamp circuit means by said inverter circuit for generating a voltage sensor signal; said commutation circuit means being further responsive to said voltage sensor signal to regulate the current in said lamp circuit means.

25. The apparatus of claim 23 further comprising second detector circuit means responsive to the current in at least one of said control switching means for disabling said driver circuit means when the current in said one control switching means exceeds a predetermined value.

26. The apparatus of claim 23 further comprising fault detection circuit means responsive to the occurrence of a predetermined fault in said inverter circuit for generating a fault signal; and intialization circuit means responsive to said fault signal to inhibit said driver circuit means when such fault is detected for a predetermined initialization period of time to permit the circuitry to stabilize in response to the generation of such fault detection signal, said initialization circuit being further operative during initial start-up to disable said driver circuit means for said predetermined initialization period in response to the initial application of power to said inverter circuit.

* * * * *